United States Patent [19]

Putzer

[11] 4,027,845

[45] June 7, 1977

[54] FLEXIBLE MOLD INCLUDING RIGID ENCAPSULATED MANDREL

[75] Inventor: Raymond M. Putzer, Racine, Wis.

[73] Assignee: Precision Flexmold, Inc., Racine, Wis.

[22] Filed: Apr. 28, 1975

[21] Appl. No.: 572,101

[52] U.S. Cl. .............................. 249/142; 249/177; 264/313; 425/DIG. 44; 425/440

[51] Int. Cl.[2] ...................... B28B 7/16; B28B 7/28; B29C 1/06

[58] Field of Search ........ 249/127, DIG. 1, DIG. 2, 249/142, 149, 150, 152, 153, 177, 178, 183, 185, 186, 179, 63, 64, 94, 122, 124, 112; 425/DIG. 57, 803, DIG. 58, DIG. 44, DIG. 43, DIG. 14, 440; 264/334, 335, 336, 82, 83, 313, 314; 164/30, 16

[56] References Cited

UNITED STATES PATENTS

| | | | |
|---|---|---|---|
| 3,008,205 | 11/1961 | Blaies | 264/83 |
| 3,171,169 | 3/1965 | Graef | 164/16 |
| 3,196,777 | 7/1965 | Luker | 249/DIG. 1 |
| 3,776,683 | 12/1973 | Putzer et al. | 425/DIG. 44 X |
| 3,815,863 | 6/1974 | Andeweg | 425/DIG. 44 X |
| 3,883,109 | 5/1975 | Hahne | 425/DIG. 44 |

*Primary Examiner*—Francis S. Husar
*Assistant Examiner*—John S. Brown
*Attorney, Agent, or Firm*—James E. Nilles

[57] ABSTRACT

An apparatus for molding articles free of seams and parting lines including a one-piece flexible mold which is deformable and which includes a rigid core member, and a vacuum pot which is used to cause the mold to expand radially outwardly to allow the molded article to be released. The core member may comprise a rigid central mandrel which is rigidly embedded in the bottom wall of the mold and which is hollow and includes ports such that a pressurized catalytic gas may be injected into the mold material to cause a bonding agent to set.

5 Claims, 4 Drawing Figures

FLEXIBLE MOLD INCLUDING RIGID ENCAPSULATED MANDREL

BACKGROUND OF THE INVENTION

The apparatus of the present invention relates to a one-piece flexible mold used in conjunction with vacuum means for distending the mold radially outwardly to allow an article molded therein to be removed from the mold such that articles may be molded which are completely free of seams or parting lines.

Molding devices generally employing a flexible mold and vacuum means used for pulling the flexible mold away from the molded article are generally shown in the U.S. Pat. No. 3,776,683, issued Dec. 4, 1973 to Putzer et al. The apparatus disclosed therein generally comprises a distensible flexible mold which may be placed within a vacuum pot such that an annular vacuum chamber is formed between the vacuum pot and the mold causing the flexible mold to be radially outwardly distended away from the formed article thereby permitting the article to be removed from the mold.

SUMMARY OF THE INVENTION

The present invention is an improvement over the prior art flexible molds and provides a generally hollow one-piece, distensible flexible mold capable of forming articles having substantial backdraft or undercut portions and includes means for supporting substantially rigid core members used to define bores or cavities in the molded article. One embodiment of the present invention is an improvement over the prior art flexible molds in that it includes means for injecting and evenly distributing a catalytic gas into the material which is molded such that a bonding agent in the molding material may be caused to react and rigidly set to form a molded article. This embodiment of the invention includes a one-piece flexible mold having a rigid central core member which houses passages for conducting a catalytic gas into the mold cavity and such that the catalytic gas is evenly distributed throughout the molding material. A second embodiment of the present invention includes a flexible mold having a first core member which is embedded in the bottom wall of the mold and extends upwardly into the mold cavity to be received by a complementary bore in a second core in such a manner as to accurately position and align the second core.

In the present invention the flexible mold generally comprises a cylindrical body having a bottom wall and being open at the top. The mold has side walls are made of a flexible material but are of sufficient thickness to be self-supporting and capable of supporting the weight of a molding material placed in the mold. The mold also includes a radially extending flange around its upper periphery which is capable of freely supporting the mold without substantial distortion when the mold is suspended in a vacuum pot with the flange resting on the upper edge of the pot. The mold can thus be suspended to form an annular vacuum chamber with the pot and with the radially extending flange forming a vacuum seal with the upper peripheral edge of the pot. When vacuum is applied to the chamber, the mold is pulled downwardly into the vacuum pot and the outer flexible walls are caused to expand radially outwardly from the molded article so that it can be removed. The flexible mold also includes a central upwardly extending core member which is rigidly embedded in the material comprising the bottom wall of the mold. The core member is generally cylindrical and includes a flange extending around its lower periphery. This flange may be securely encapsulated by the molded material comprising the bottom wall such that the flange rigidly anchors the central core member with respect to the mold.

In one embodiment of the present invention the core member, is generally hollow and includes a plurality of ducts positioned around its periphery and located near the bottom wall of the mold. The core member also includes a horizontal upper end which is generally coplanar with the top of the flexible mold and flange and which includes a bore facilitating the admission of catalytic gas into the hollow core member. In operation the flexible mold is packed with a resin bonded sand material, and a catalytic gas is then forced into the core member and through the ducts at the bottom of the core member such that the gas is forced through the resin bonded sand molding material from the bottom of the mold cavity and upwardly out of the mold. The catalytic gas has an effect on the bonding agent causing it to quickly react to rigidify the molded material.

An object of the present invention is to provide means to facilitate the introduction of catalytic gas into the mold material in such a manner that it is evenly distributed throughout the molded material to insure that all parts of the mold are effected by the gas.

A further object of the present invention is to provide means to securely anchor an upwardly extending core member such that it may accurately position an opposing core member to maintain a uniform thickness of a generally annularly shaped molded article.

Additional objects and advantages will become apparent from the following detailed description of the invention.

The illustrated embodiments have been shown for illustrative purposes only and it is understood that, given the disclosure herein, many variations and combinations can be made without departing from the spirit and scope of the claimed invention.

DESCRIPTION OF THE PREFERRED EMBODIMENT

Generally, the present invention is concerned with the production of articles formed of hardenable material in flexible molds. Various types of materials may be molded with the present invention, but of particular importance are those materials which generally include resin bonded sands and other materials which are caused to set in response to contact with a catalytic gas. For example, a mixture of sodium silicate and sand can be used as a molding material and carbon dioxide used as a catalytic gas. When the carbon dioxide is forced into the sodium silicate and sand mixture the resulting reaction causes the mixture to set up to form a rigid molded article.

The flexible material used to comprise the mold body may be of various types having elastomeric properties and includes, but is not limited to, such materials as polyvinylchloride "Korogel" produced by B. F. Goodrich of Akron, Ohio, polysulphide cold molding compounds sold by Perma Flex of Columbus, Ohio, and the silastic RTV silicone rubber produced by Dow Corning and General Electric. Polysulphide synthetic rubber material has also been found to be advantageous as a mold material. These materials can be used to produce a mold having a relatively thick and self-supporting wall of considerably varying thickness which is substantially elastomeric and which is also particularly dimensionally stable.

Figure 1:
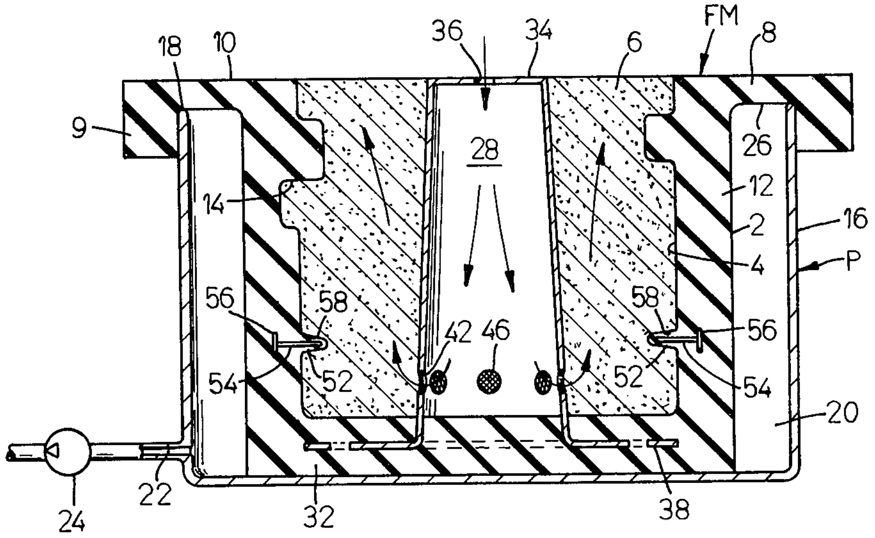
FIG. 1 is a cross sectional side elevation view of a first embodiment of a flexible mold of the present invention including a hollow core member being positioned in a vacuum pot.
Figure 2:
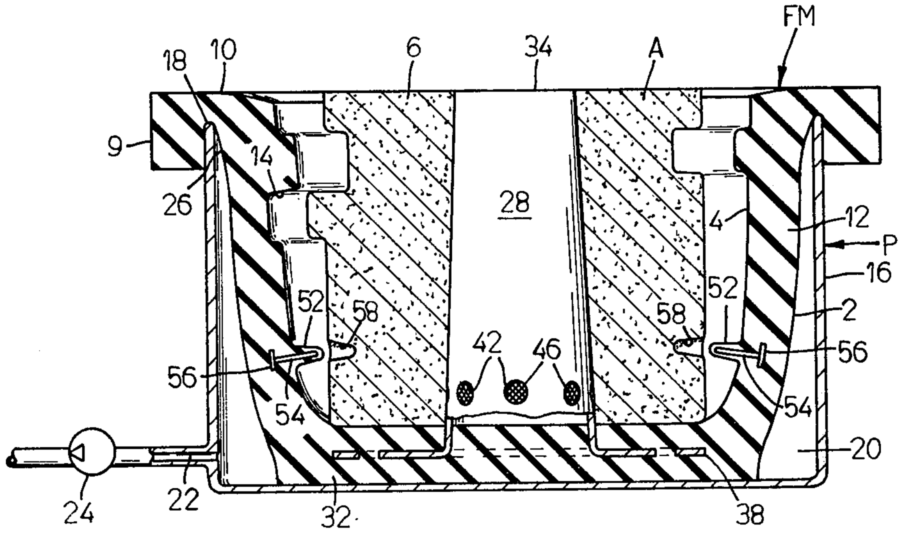
FIG. 2 is a view similar to that of FIG. 1 but showing the reaction of the flexible mold when a vacuum is drawn in the vacuum pot.

The invention is generally shown in FIGS. 1–2 as including a generally hollow, one-piece distensible flexible mold FM. This mold has a main generally portion 2 which defines a mold cavity 4 which in turn is filled with molding material 6 which may comprise, for example, a mixture of sand and sodium silicate. Adjacent the upper end of the cylindrical portion 2 is an integrally formed and relatively thick and self-supporting radially extending annular flange 8 having an upper surface 10 which is generally flat, smooth and unobstructed. The periphery of the flange 8 includes a downwardly extending lip 9. The cylindrical portion 2 includes a side wall 12 which is of a thickness which varies throughout its height to define backdraft of undercut portions 14. The side wall 12 is of such thickness that it is generally self-supporting and will support the weight of the molding material 6 poured into the mold cavity 4 without distortion of the mold FM.

The flexible mold FM is positioned concentrically in a vacuum pot P. The pot P includes an upwardly extending side wall portion 16 having an upper edge 18 which will support the flange 8. The flexible mold FM and the vacuum pot P form a sealed annular chamber 20 which is connected by means of a passageway 22 leading to a conventional vacuum pump 24 with the flexible mold suspended by flanges 8 on the upper surface 18 of the pot walls. The flexible mold FM is suspended from the edge 18 of the vacuum pot P without substantial distortion of the flange 8, but with the weight of the flexible mold FM maintaining a seal between the lower surface 26 of the flange 8 and the upper edge 18. The downwardly extending lip around the periphery of flange 8 is designed to fit around the upper edge of the pot wall and to center the mold within the pot and to prevent the mold from being completely pulled into the pot when vacuum is applied. During the operation of the molding apparatus, when the vacuum is applied by the vacuum pump 24 it can be readily appreciated that the pressure differential formed between the chamber 20 and the atmospheric pressure on the flexible mold is sufficient to cause the side walls 12 of the mold to be forced outwardly away from the molded article A, as shown in FIG. 2, such that the molded article A may be pulled out of the flexible mold FM.

As shown in FIGS. 1 and 2 the flexible mold FM also includes a rigid mandrel 28 which extends upwardly from the bottom wall 32 of the mold. Generally, the rigid mandrel 28 comprises a slightly tapered cylinder having a larger diameter near the bottom wall 32 of the mold than at the top of the mold. The mandrel 28 includes an upper end 34 which is generally coplanar with the upper surface 10 of the flange 8 and which is closed except for a bore 36 through its center. The mandrel 28 includes at its other end a radially extending flange 38 surrounding its periphery and embedded in the bottom wall 32 of the flexible mold. The flange 38 is securely anchored in the bottom wall 32 and at a location generally intermediate its thickness. The core member 28 also includes a plurality of ports 42 which are spaced around its periphery at a location relatively close to the bottom wall of the mold providing communication between the hollow mandrel 28 and the mold cavity 4 formed between the core 28 and the walls 12 of the flexible mold. The ports 42 include screens 46 disposed therein to allow gas to pass therethrough but to prevent molding material from entering the hollow mandrel 28. Screens of the type shown as 46 are well known in the art.

During the molding process a molding material such as a mixture of sodium silicate and sand is poured into the mold cavity 4 between the flexible mold wall 12 and the core 28 and is securely packed therein. A source of pressurized catalytic gas is then connected to the bore 36 in such a manner that the gas may be forced into the mandrel 28 under pressure. The catalytic gas passes through the mandrel 28 and through ports 42 into the relatively porous material that has been poured into the mold cavity. The gas is forced into this material at a location near the bottom of the mold cavity and is caused to generally move upwardly, passing through the molding material in order to exit from the mold cavity and is substantially dispersed evenly throughout the molding material. If, for example, the molding material comprises a sand which is relatively porous an which is bonded with a material which is reactive with $CO_2$, such as sodium silicate, $CO_2$ gas may be forced through the core 28 and through the sand and sodium silicate mixture to cause the mixture to set and to form a rigid molded article A. Vacuum may then be applied in the chamber 20 in the manner as previously described to cause the molded article to be released from the mold. When the side walls of the flexible mold are pulled away from the molded article, the article may be pulled upwardly off the mandrel 28 and out of the mold. The slight taper of the mandrel 28 facilitates the easy removal of the molded article.

The flexible mold FM shown in FIGS. 1 and 2 also includes a plurality of inwardly extending projections 52. As can be readily appreciated, when the projections 52 are required to form inwardly extending undercuts 58 of substantial depth but of relatively narrow width, the flexible mold material comprising the projection 52 may be incapable of self-support particularly when the molding material is poured to provide means to lend support into the mold. Therefore, the projections are supported by rigidifying members 54 imbedded within the flexible material. The rigidifying members each include a flanged end portion 56 which is embedded in the side wall of the mold to the rigidifying member 54.

Figure 3:
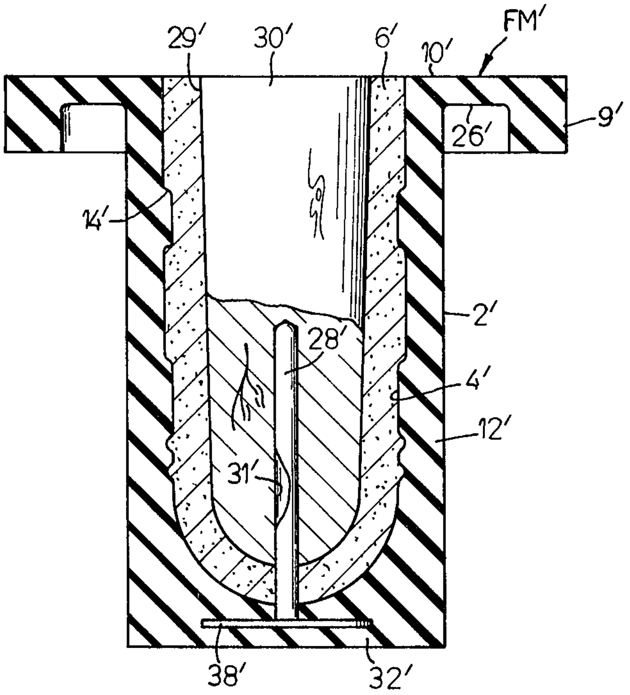
FIG. 3 is a cross sectional side elevation view of a second embodiment of the flexible mold of the present invention.
Figure 4:
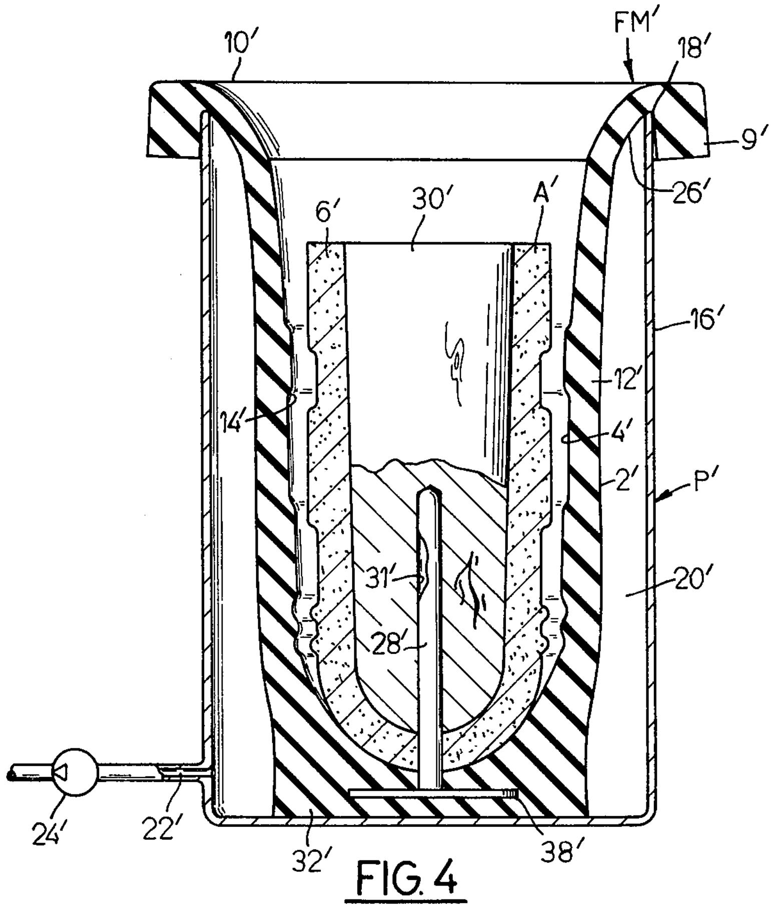
FIG. 4 is a view similar to that of FIG. 3 showing the mold in an expanded state due to a vacuum drawn in a vacuum pot.

FIGS. 3 and 4 illustrate another embodiment of the flexible mold of the present invention. Elements corresponding to those of the embodiment of FIGS. 1 and 2 are referred to by corresponding primed numbers, the flexible mold FM′ including a central upwardly extending core member 28′ which is embedded in the bottom wall 32′ of the flexible mold FM′ in order to support and align a complementary downwardly extending core 30'. The molding apparatus of this embodiment is particularly advantageous for molding items such as decorative lamp bases which are hollow, have a sculptured outer surface and require a small diameter bore at one end to accommodate wiring.

In this embodiment of the invention core member 28' includes a flange 38' rigidly secured to one end. The flange member 38' is embedded in the bottom wall 32' of the flexible mold FM' generally intermediate its wall thickness and such that the core member 28' projects upwardly from the bottom wall 32' into the center of the mold cavity 4'. The downwardly extending core member 30' includes a surface 29' which may be polished and coated with a lubricant such that the downwardly extending core member may be easily removed from the molded article when the molding process has been completed. The core member 30' includes a relatively long, narrow bore 31' in its downwardly extending end for receiving the upwardly extending core member 28' therein. The bore 31' is of a diameter only slightly larger than the diameter of the core member 28' so that a relatively tight fit is maintained between the bore and core member and so that the core member 28' supports the core member 30'. The upwardly extending core member 28' thus accurately positions the downwardly extending core member with respect to the side walls 12' and bottom wall 32' to form an annular chamber 40' therewith, with the dimensions of said chamber 4' being substantially equal around the entire circumference of the chamber such that an article molded in the mold shown in FIG. 3 will be generally hollow and include a bore through one end caused by the core member 28' and be of a generally uniform thickness.

As shown in FIG. 4, the article molded with the flexible mold of FIG. 3 can be removed from the mold in substantially the same manner as was described with respect to FIGS. 1 and 2. The mold FM' is placed in the vacuum pot P' and a vacuum is drawn in the annular chamber 20' formed between the flexible mold FM' and the pot P'. When the walls of the mold FM' are caused to expand radially outwardly the molded article A' and the core member 30' may be pulled vertically upwardly off of the core member 28' and out of the mold. The core member 30' may then be removed in a manner well known in the prior art.

RESUME

The apparatus of the present invention thus shows a means of forcing a catalytic gas into a molding material in such a manner that it is evenly distributed throughout the molding material. The present invention also shows the means of securely anchoring a core member with respect to a flexible mold and shows a complementary means of using said anchored core member to accurately support on otherwise unsupported coaxial mating core member.

I claim:

1. Apparatus for molding seamless articles comprising a generally hollow, one-piece distensible flexible mold having a bottom wall and side walls of such thickness that the mold is self-supporting and supports the weight of a molding material poured therein without distortion of said mold, and a rigid upwardly extending core member having a radially extending flange around the periphery of its lower portion fixedly embedded in the bottom wall of said mold and positioned intermediate the thickness of said bottom wall, and a downwardly extending core member received in said mold and defining an annular chamber therewith, said downwardly extending core including an axially extending bore for receiving therein said upwardly extending core member in mating engagement such that said downwardly extending core member is supported and positioned with respect to said mold by said upwardly extending core, said core members and said mold defining a generally annular chamber for receiving molding material.

2. The apparatus set forth in claim 1 wherein the side walls of said mold have substantial undercut portions therein and wherein the mold includes a substantially thick radially extending flange around its upper portion for supporting said mold in the vacuum pot.

3. A mold for use with a vacuum pot, comprising: a generally hollow, one-piece distensible flexible mold having a bottom wall and side walls defining a mold cavity, said side walls being of such thickness that the mold is self-supporting and supports the weight of molding material poured therein without distortion of said mold, said mold including a rigid upwardly extending core member disposed within said mold cavity, said upwardly extending core member including a lower end having a radially extending flange fixedly embedded in the bottom wall of the mold and supporting said core member in a vertical position in said cavity, and further including a downwardly extending core member having an axially extending bore in one end for receiving therein said upwardly extending core member in mating engagement, wherein said downwardly extending core member is supported in position with respect to said mold by said upwardly extending core member in such a manner as to define an annular mold cavity with said mold.

4. A mold for use with a vacuum pot, comprising: a generally hollow, one-piece distensible flexible mold having a bottom wall and side walls defining a mold cavity, said side walls being of such thickness that the mold is self-supporting and supports the weight of molding material poured therein without distortion of said mold, said mold including a rigid upwardly extending core member disposed within said mold cavity, said upwardly extending core member including a lower end in the bottom wall of the mold and supporting said core member in a vertical position in said cavity, and further including a downwardly extending core member having an axially extending bore in one end of receiving therein said upwardly extending core member in mating engagement, wherein said downwardly extending core member is supported in position with respect to said mold by said upwardly extending core member in such a manner as to define an annular mold cavity with said mold.

5. The apparatus set forth in claim 4 wherein the side walls of said mold have substantial undercut portions therein and wherein the mold includes a substantially thick radially extending flange around its upper portion for supporting said mold in said vacuum pot.

* * * * *